No. 848,484. PATENTED MAR. 26, 1907.
T. NEWNHAM.
APPARATUS FOR EXTRACTING BY-PRODUCTS FROM WOOD.
APPLICATION FILED SEPT. 6, 1906.
2 SHEETS—SHEET 1.
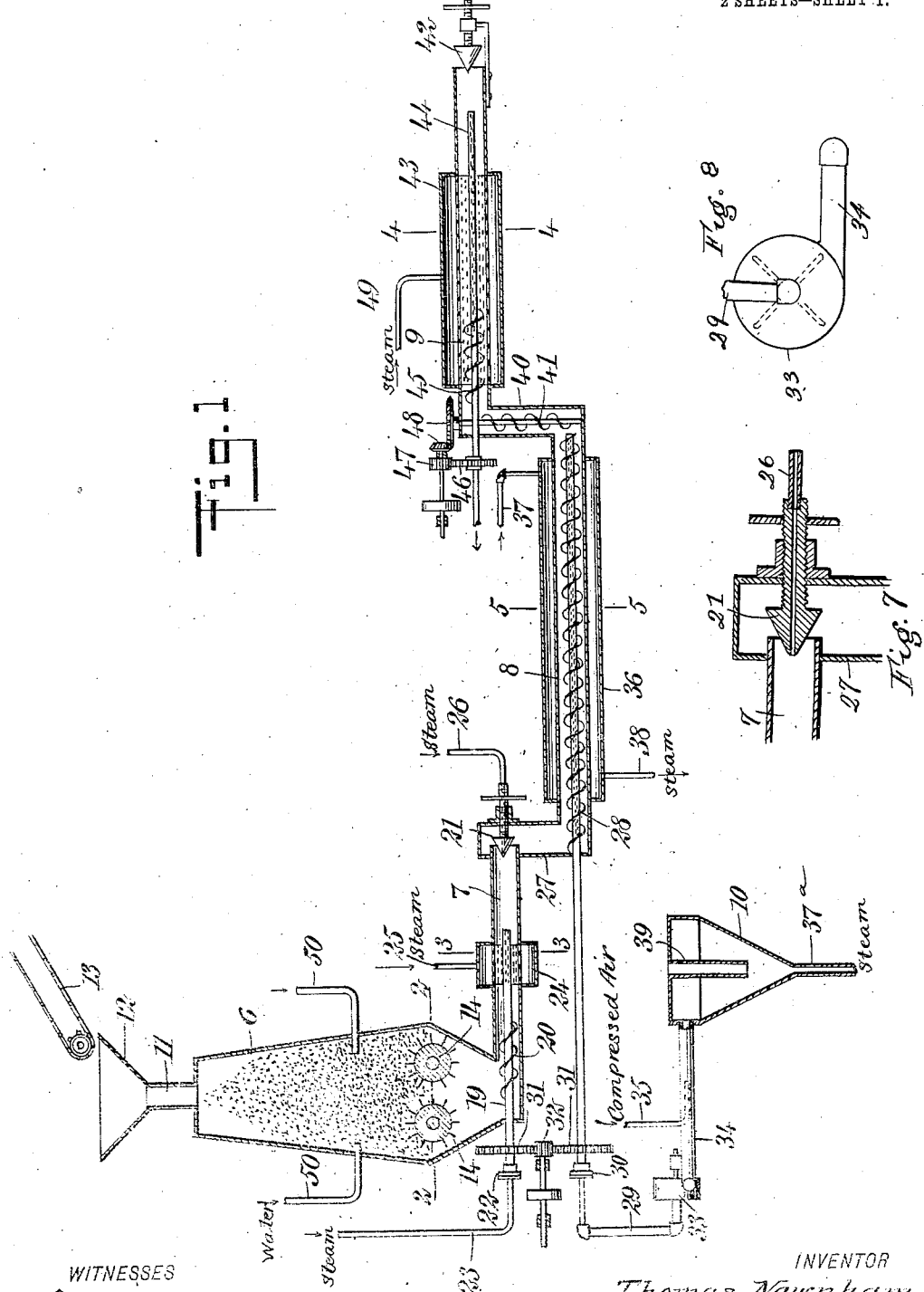
WITNESSES
INVENTOR
Thomas Newnham
BY
ATTORNEYS

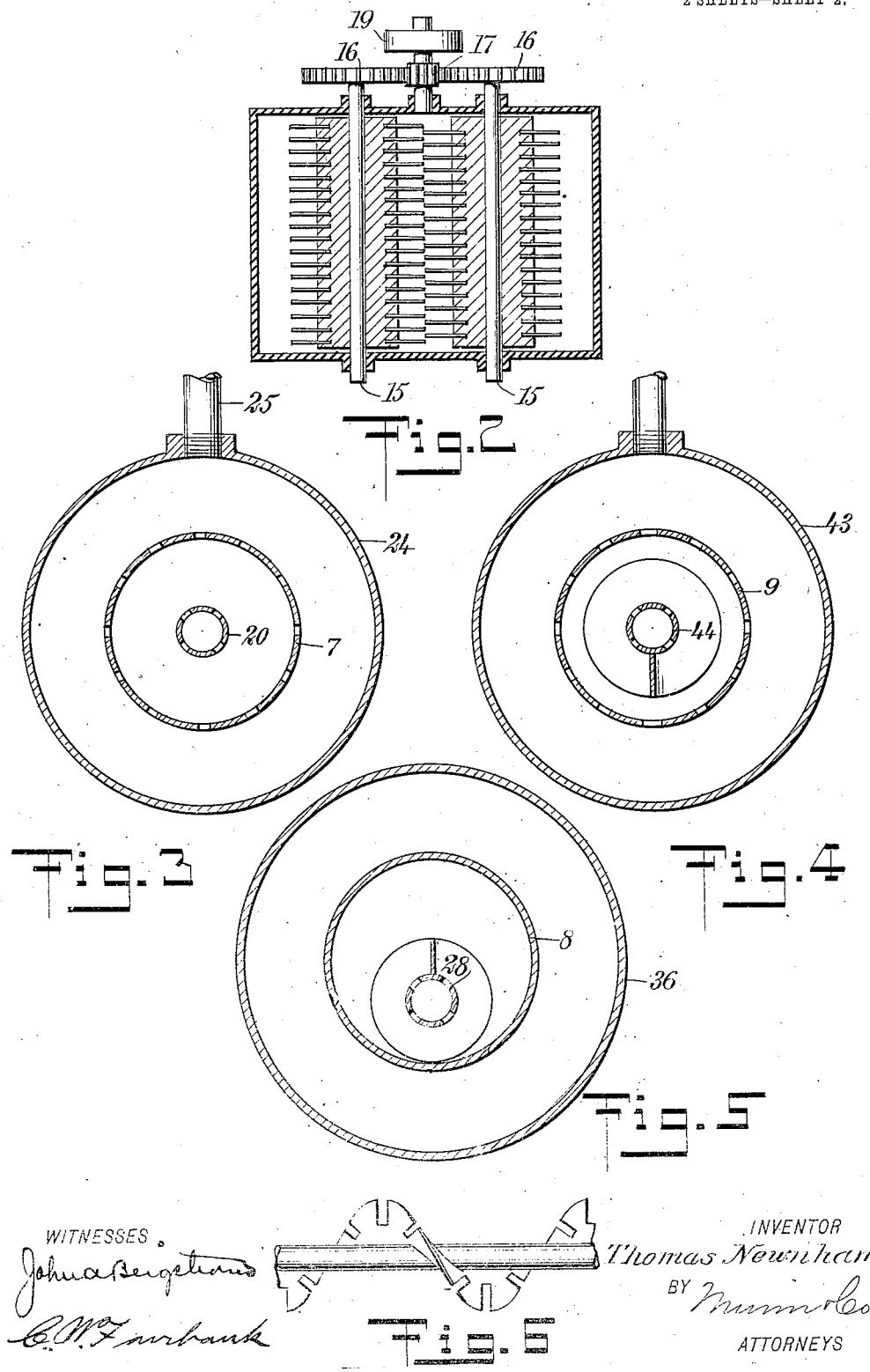

UNITED STATES PATENT OFFICE.

THOMAS NEWNHAM, OF WHITE SPRINGS, FLORIDA.

APPARATUS FOR EXTRACTING BY-PRODUCTS FROM WOOD.

No. 848,484.      Specification of Letters Patent.      Patented March 26, 1907.

Application filed September 6, 1906. Serial No. 333,434.

*To all whom it may concern:*

Be it known that I, THOMAS NEWNHAM, a citizen of the United States, and a resident of White Springs, in the county of Hamilton and State of Florida, have invented a new and Improved Apparatus for Extracting By-Products from Wood, of which the following is a full, clear, and exact description.

This invention relates to a continuous distillation of turpentine and other by-products from finely-subdivided wood—as sawdust, chips, shaving, or the like—and the recovery of these by-products.

The invention more in detail relates to the construction and relative arrangement of the parts, involving also new features of operation whereby the practical difficulties heretofore encountered in this art are overcome and the efficiency very materially increased.

The object of my invention is to provide an apparatus for distilling wood, whereby I obtain the essential oils and other useful products therefrom—such as turpentine, creosote, tar, and alcohol—by one continuous distilling operation without the necessity of interrupting the operation at any time to feed in a new supply of wood or to draw off the by-products.

Reference is to be had to the accompanying drawings, forming a part of this specification, in which similar characters of reference indicate corresponding parts in all the figures, in which—

Figure 1 is a longitudinal section through a simplified form of construction, but involving my invention. Fig. 1ª is a detail view showing the separator in central vertical section. Fig. 2 is a cross-section on the line 2 2 of Fig. 1. Figs. 3, 4, and 5 are vertical sections on the lines 3 3, 4 4, and 5 5 of Fig. 1. Fig. 6 shows a modified form of one of the screw conveyers employed. Fig. 7 is a detail section showing the construction of the outlet-controlling means, and Fig. 8 is an end elevation showing one form of vacuum-producing means.

My improved apparatus comprises five main essential devices—namely, the receiving-bin 6, the high-pressure steaming-cylinder 7, the extracting-chamber 8, the high-temperature steam-chamber 9, and the condenser and separator 10. The receiving-bin comprises a receptacle tapering both upward and downward from a point intermediate its ends and provided at the upper end with a comparatively narrow neck 11 and hopper 12, to which the sawdust or other material to be operated upon is delivered by a belt conveyer 13 or in any other suitable manner.

Two large feed-rollers 14 are located between the bin at its point of greatest diameter and are mounted on shafts 15, extending through the outer walls of the bin and provided with gear-wheels 16, intermeshing with a pinion 17, adapted to be rotated by a pulley 18, or in any other suitable manner. The two feed-rollers are thus rotated in the same direction and tend to force the sawdust down into the lower portion of the bin and down into the horizontal cylindrical chamber 7. The sawdust is here conveyed longitudinally of the chamber by a rotating hollow shaft 19, having a screw conveyer 20.

The end of the chamber is provided with an adjustable cone 21, adapted to close the end of the tube and so mounted that it may be held rigid at any distance from the end desired.

The hollow shaft 20 is connected, through a packing-joint 22, to a pipe 23 for admitting steam, and the inner end of the rotating shaft is provided with a large number of small perforations through which the steam may escape into the chamber.

Surrounding the intermediate portion of the chamber is a steam-box 24, having a steam-inlet pipe 25, the separating-wall between the steam-box and the chamber being provided with perforations for the admission of steam to the chamber at this point. If desired, steam may also be admitted through a pipe 26, connected by a packing-box to the support of the adjustable cone 21 and steam admitted to the chamber through one or more perforations in the point of the cone.

The wood, which is agitated and tightly packed in the chamber 7, is subjected to the influence of the steam and becomes thoroughly saturated with the latter. As the sawdust becomes more and more tightly packed in the chamber 7 small quantities of it continuously escape around the cone 21 and drop through the vertical passage 27 into the extracting-chamber 8.

The extracting-chamber is also provided with a hollow shaft 28, having a screw conveyer for agitating and moving the material along toward the discharge end; but this conveyer preferably is of smaller diameter than the inner wall of the tube and is not adapted for tightly packing the material. The hollow shaft is perforated throughout its entire length within the chamber 8 and on the outside of said chamber extends parallel to the hollow shaft 19 to a point slightly beyond the end of the receiving-bin. At this point it is connected to a stationary pipe 29 by means of a packing-box 30, and the two shafts 19 and 28 are each provided with gear-wheels 31, meshing with a pinion 32, whereby the two shafts are simultaneously rotated in the same direction. The pipe 29, which is connected to the hollow shaft 28, extends to an exhaust-fan 33, which latter discharges, through a pipe 34, to the separator 10, while a compressed-air-discharge pipe 35 enters the pipe 34 intermediate the fan and the separator and serves to condense the steam and volatile by-products carried along therewith. The exhaust-fan 33 creates a partial vacuum within the chamber 8, while a high temperature is maintained by a jacket 36, surrounding the chamber and provided with steam inlet and discharge pipes 37 and 38, so arranged that the steam flows in the opposite direction to the flow of the material and of the exhaust-steam and by-products within the hollow shaft. The condenser may be of any type desired, but preferably is funnel-shaped, with a discharge-pipe 37ª at its lower end and having the top closed, save for an open-ended inwardly-extending pipe 39, through which the compressed air may escape.

Extending upward from the discharge end of the extracting-chamber 8 is a conduit 40, having a screw conveyer 41, adapted to withdraw the material from the extracting-chamber 8 and deliver it to the superheating-chamber 9. This latter chamber is provided at its discharge end with an adjustable cone 42, similar to the cone 21 and which when screwed up closely adjacent the end of the tube permits of the packing of the material within the chamber and the creating of very high pressures. The chamber 9 is surrounded by a steam-jacket 43, to which superheated steam is discharged and from which it may escape to the chamber 9 through a plurality of perforations in the walls of the latter. The chamber 9 is provided with a hollow perforated shaft 44, having a conveyer 45, adapted to be rotated simultaneously with the conveyer 41 by means of a suitable gear-wheel 46, pinion 47, and bevel-gears 48. Superheated steam is delivered through the pipe 49 to the jacket 43 and escapes into the highly-compressed material within the said chambers. In order to escape, it must pass entirely through said material to the centrally-located perforated pipe of shaft 44, which latter is connected to an exhaust-fan, condenser, and separator, similar to the exhaust-fan, condenser, and separator above described.

In the operation of my improved device the cones 21 and 42 are adjusted to maintain very high pressures in the chambers 7 and 9, while the material falls loosely from the cone 21 and passes in a light subdivided state through the chamber 8 at a very low pressure. The temperature of the chambers 7 and 8 are maintained substantially at the temperature of live steam, while the chamber 9 is maintained at a substantially higher temperature, as the steam delivered to said chamber has been previously superheated. All of the material which are lighter than water or soluble in it are extracted from the wood in the chamber 8 and delivered to the condenser shown; but the by-products, which are heavier than water or essentially non-soluble therein, are extracted in the chamber 9 by the effect of the high temperature of the superheated steam and of the low pressure effected by the exhaust-fan (not shown) connected to the end of the hollow perforated shaft 44. The high pressure, together with the mechanical movement of the screw conveyer within the chamber 7, causes the sawdust to pass through the chamber with a rolling movement, each particle crushing and pressing against the others under a high pressure, causing the gums in the wood to be extracted and mingle with the saturated steam and cause the latter to become thoroughly saturated before it reaches the adjacent cone. The high pressure and the low temperature maintained in this chamber are very valuable in the accomplishment of the results desired, and the apparatus for obtaining these results constitutes an important part of my invention. After the sawdust passes through the adjustable cone the pressure drops to a partial vacuum, and all of the saturated steam and the extracted by-products are drawn off and conveyed to the separator 10.

In Fig. 6 I have illustrated a form of conveyer in which the spiral web is subdivided into a plurality of parts, and I find this form possesess many advantages in that it keeps the sawdust continuously rolling and stirred up while it passes through the chambers, particularly through the extracting-chamber 8. It is evident that any other type of condenser may be employed in place of that shown, and I do not wish to limit myself to compressed air as the condensing agent, as a surface condenser may be found very advantageous in practice. The receiving-bin may, if desired, be provided with sprinkling-pipes 50, through which a small quantity of hot water may be admitted to the sawdust before it is delivered to the compressing and steaming chamber 7. This tends to soften up and open the pores in the wood to better prepare it for the steaming and pressing process it receives in the operation.

The tapering walls of the bin prevent the sawdust from clogging or sticking in the bin and permitting it to fall by its own gravity to the top of the feed-rollers 14 14. The dust cannot pass the feed-rollers until they are rotated, so that by stopping and starting these rollers the feed of the material to the chamber 7 may be readily controlled.

As the bin 6 is practically closed at the top and is provided with only a narrow neck, any vapors which might rise through the bin due to the heating carried on in the chamber 7 would be condensed before they reach this neck, or in case they would not the cool dust within the neck would tend to immediately condense them and cause them to be returned into the bin.

By the use of my improved apparatus above described all of the turpentine and other materials within the wood which it is possible to extract by the use of high pressure and high temperature are drawn off, and the remaining wood, which escapes past the adjustable cone 42, is in a dry state and may, if desired, be employed as fuel to generate the steam and power required to operate the apparatus.

Having thus described my invention, I claim as new and desire to secure by Letters Patent—

1. An apparatus of the character described, comprising a receiving-bin, a chamber connected thereto, means controlling the feed to said chamber, means for compressing the material within said chamber, means for controlling the outlet therefrom, and means carried by said controlling means for injecting a heating medium into said material.

2. A device of the character described, comprising a receiving-bin, a chamber connected thereto, means for regulating the size of the outlet-opening, means for pressing the material within the said chamber, and means for simultaneously heating said material.

3. An apparatus of the character described, comprising a receiving-bin, a chamber connected thereto, a hollow shaft located therein, a screw conveyer carried by said shaft, means for rotating said shaft, means for admitting steam to said chamber through said shaft, and an adjustable cone located at the discharge end of said chamber and adapted to close said end.

4. An apparatus of the character described, comprising a receiving-bin, a chamber connected thereto, a screw conveyer within said chamber, a steam-box surrounding said chamber and separated therefrom by a perforated wall, means for rotating said conveyer, means for admitting steam to said steam-box and chamber, whereby the material within the chamber is compressed and simultaneously heated, and an adjustable cone located adjacent the discharge end of the chamber and by which the pressure within the chamber may be controlled.

5. An apparatus of the character described, comprising a chamber, means for delivering a heated and compressed material thereto, a hollow perforated shaft located within said chamber, a screw conveyer carried by said shaft, means surrounding said chamber for heating the same, and means connected to said hollow shaft for creating a partial vacuum within said chamber.

6. An apparatus of the character described, comprising a chamber, means for heating said chamber, means for agitating the material located therein, means for creating a partial vacuum, whereby the fluid contents are removed, a compressed-air pipe adapted to deliver compressed air to said fluid contents at the discharge end of the vacuum-creating means, and a condenser adapted to separate the liquid from the gaseous products.

7. An apparatus of the character described, comprising a chamber, means surrounding said chamber and adapted to deliver a fluid through perforations in the walls thereof, a hollow tube within said chamber and provided with perforated walls, and means carried by said tube whereby the material within the chamber may be compressed and the fluid contents extracted through said tube.

8. An apparatus of the character described, comprising a chamber, a hollow perforated shaft located in said chamber, a screw conveyer carried by said shaft, an adjustable cone located at the discharge end of said chamber, means for delivering material to said chamber, and a steam-jacket surrounding said chamber and separated therefrom by a perforated wall, whereby the material within said chamber may be compressed and superheated steam admitted to the chamber from the jacket and drawn off together with certain of the fluid constituents of the material, through the hollow perforated shaft and the remaining solid material permitted to escape around the adjustable cone.

In testimony whereof I have signed my name to this specification in the presence of two subscribing witnesses.

THOMAS NEWNHAM.

Witnesses:
N. P. IVES,
W. G. CATE.